INVENTOR
VERNON S. ANKENY
BY
Dick & Zarley
ATTORNEYS

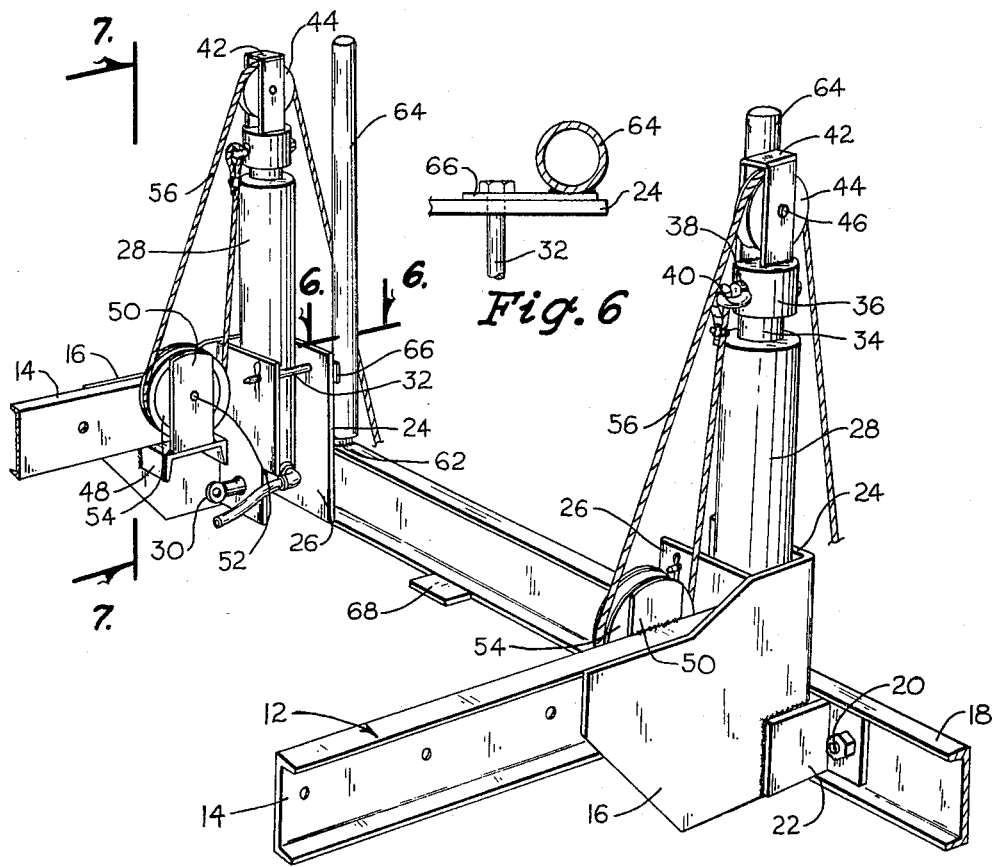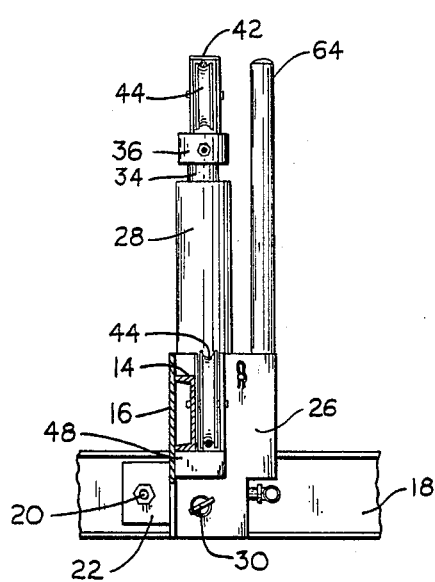

3,283,927
TOWING DEVICE
Vernon Scott, Ankeny, Blue Earth, Minn., assignor to Greater Iowa Manufacturing Company, a corporation of Iowa
Filed Jan. 31, 1964, Ser. No. 341,668
11 Claims. (Cl. 214—86)

This invention relates to towing devices and more particularly to towing devices which are attached to the rearward lower end of the prime-mover vehicle.

Towing devices per se are old in the art. The great majority of towing devices are installed in the box portion of a truck. Because of this method of installation the truck box cannot be utilized to its full extent. Another serious drawback to the towing devices presently existing is that the towed vehicle is not prevented in any manner from striking the rear end of the towing vehicle. Another disadvantage to previously devised towing devices was that the device could not be moved to a position which would not interfere with other activity when the device was not being used. A further disadvantage was the fact that the towing devices could not be readily attached or detached from the towing vehicle.

Therefore, one of the principal objects of the invention is to provide a device which will effectively tow a trailing vehicle.

A further object of the invention is to provide a device which will prevent the trailing vehicle from striking the towing vehicle.

A further object of the invention is to provide a device which does not interfere with the utilization of the truck box of the towing vehicle.

A further object of the invention is to provide a device which can be moved to a non-operative position which will not interfere with the operation of the towing vehicle.

A further object of the invention is to provide a device which can be readily attached to or detached from a towing vehicle.

A still further object of the invention is to provide a device which is economical of manufacture, durable in use and refined in appearance.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 5 is a perspective view of the device;

FIG. 6 is a sectional view of the device as seen on line 6—6 of FIG. 5, at an enlarged scale; and FIG. 7 is a sectional view of the device as seen on line 7—7 of FIG. 5, at an enlarged view.

Figure 1:
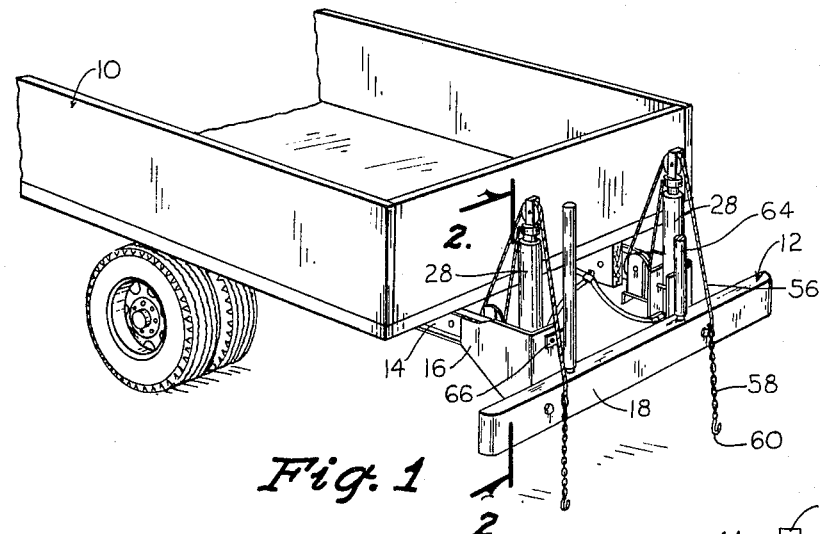
FIG. 1 is a partial perspective view of the device secured to the rear end of a truck.
Figure 2:
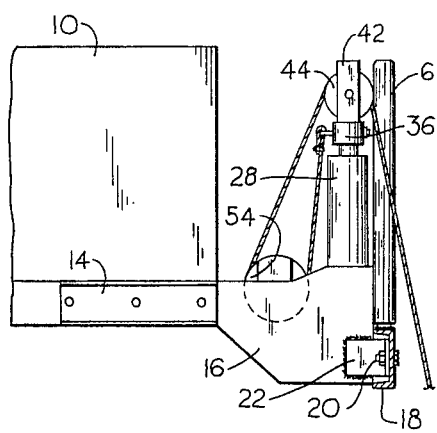
FIG. 2 is a cross-sectional view of the device as seen on line 2—2 of FIG. 1, at an enlarged scale, when the piston rod is withdrawn into the hydraulic cylinder.
Figure 3:
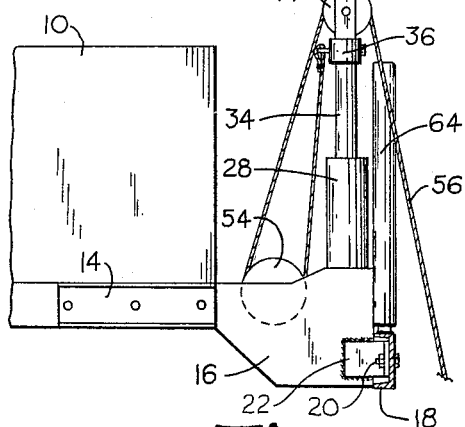
FIG. 3 is a cross-sectional view of the device as seen on line 2—2 of FIG. 1, at an enlarged scale, when the piston rod is extended from the hydraulic cylinder.

The numeral 10 generally designates a vehicle, the rearward part of which is shown in FIG. 1. The numeral 12 generally designates a towing device, which is comprised of a pair of vertically disposed parallel channel members 14, and a supporting bracket 16 rigidly secured to the rearward end of each of channel members 14 by means of welding or the like. A horizontal, elongated bumper member 18 is detachably secured to each of the supporting brackets 16 by means of a bolt 20 extending through bumper 18 and engaging a bracket 22 which is secured to the outer side of supporting bracket 16 by welding or the like. Only one side of the device will be described as the sides are identical.

Supporting bracket 16 is comprised of a first flange member 24 which extends inwardly from the rearward end of supporting bracket 16 and at a right angle thereto and a second flange member 26 which extends inwardly from supporting bracket 16 at a right angle thereto and is parallel to first flange member 24 and in a spaced relation thereto. A hydraulic cylinder 28 is pivotally secured at its lower end to supporting bracket 16 between first flange 24 and second flange 26 by means of threaded bolt 30 extending through the second flange member 26, an eyelet of hydraulic cylinder 28 (not shown) and through first flange member 24. A pin 32 extends transversely through first flange 24 and second flange 26, which will maintain hydraulic cylinder 28 in an upright position if so desired.

Extending from the upper end of hydraulic cylinder 28 is piston rod 34 which has a detachable collar 36 slidably embracing the outer end thereof. Collar 36 is secured to piston rod 34 by means of a bolt 38 extending rearwardly through collar 36 and piston rod 34 and having an eyelet 40 on its forward end. Collar 36 has secured to its upper end a pulley bracket 42 which in turn supports a pulley 44 rotatably secured thereto by means of pin 46.

Supporting bracket 16 also has a pulley supporting bracket 48 extending inwardly from the inner surface thereof at a right angle thereto. Rigidly secured to the upper portion of bracket 48 is a pulley bracket 50 which has rotatably secured thereon by means of pin 52 a pulley 54. Pulley 54 is in direct alignment with pulley 44 when hydraulic cylinder 28 is in an upright position. A cable 56 has one end secured to eyelet 40 by any convenient means and extends first downward, thence around pulley 54, then upwardly and over pulley 44 then downwardly and terminating in a chain link portion 58. Detachably secured to the free end of chain portion 58 is a hook element 60.

Horizontal bumper 18 has rigidly secured to its top portion adjacent first flange member 24 a pair of metal stub posts 62. A pair of hollow cylindrical members 64 detachably embrace stub posts 62. Each of cylindrical members 64 has a flat bracket 66 welded thereto and adapted to be engaged by pin 32 thereby maintaining cylindrical members 64 in an upright position. A stop means 68 is secured to the inner surface of bumper 18 intermediate its length and in the pivotal path of hydraulic cylinders 28. Hydraulic cylinder 28 has an inlet-outlet port on its lower end which is connected to a conventional hydraulic system for operatively moving piston rods 34.

Vertically disposed channel members are supplied with a plurality of holes 70 to facilitate securing towing device 12 to a vehicle 10.

Figure 4:
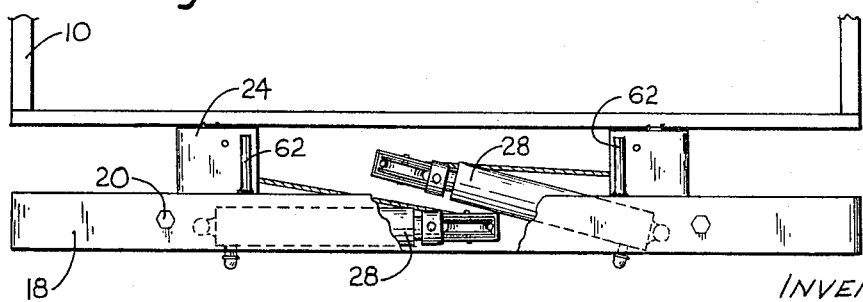
FIG. 4 is a back elevational view of the device with a portion of the bumper cut away to more fully illustrate the device.

The normal method of operation is as follows, assuming that the hydraulic cylinders 28 are in a position as shown in FIG. 4 and maintained in such a position by stop means 68 supporting cylinders 28.

Hydraulic cylinder 28 is pivoted into an upright position. Pin 32 is extended through flange members 24 and 26 and a spring clip secured thereto. The remaining hydraulic cylinder is then positioned as was the first one.

Hook elements 60 are then secured to the bumper or frame of the vehicle to be towed. A conventional hydraulic system is activated which supplies hydraulic fluid to hydraulic cylinders 28. Piston rods 34 are thereby extended which causes the lower end of cables 56 to be moved upwardly. One end of the towed vehicle will be raised from the ground. The hydraulic system is then stopped, and allowed to maintain the piston rods in their extended positions. The prime mover vehicle 10 is then driven away towing the trailing vehicle which has one end suspended above the ground. Bumper member 18 prevents the towed vehicle from striking the rear of vehicle 10. If so desired, cylindrical members 64 may be placed on stub posts 62 and maintained thereon by means of pin 32 extending through flat bracket 66, thence through flange members 24 and 26. Cylindrical members 64 also prevent the towed vehicle from striking vehicle 10 or any critical part of towing device 12. When the towed vehicle has been delivered to its place of destination the hydraulic cylinders 28 are caused to withdraw piston rods 34 thereby lowering the towed vehicle to the ground. Hook elements 60 are then detached from the towed vehicle. Hydraulic cylinders 28 may be left in an upright position when not in use or allowed to rest on stop means 68 as shown in FIG. 4.

Thus, from the foregoing, it can be seen that the device accomplishes at least all of its stated objectives.

Some changes may be made in the construction and arrangement of my towing device without departing from the real spirit and purpose of my invention, and it is my intention to cover by my claims, any modified forms of structure or use of mechanical equivalents which may be reasonably included within their scope.

I claim:

1. In a towing device, comprising in combination,
a supporting structure,
a pair of normally upright hydraulic cylinders pivotally secured to opposite sides of said supporting structure,
a piston rod slidably extending from the upper end of each of said hydraulic cylinders,
a first pulley rotatably secured to the outer end of each of said piston rods,
a second pulley rotatably secured to said supporting structure adjacent the lower end of each of said hydraulic cylinders,
a pair of cables each having one end secured to the outer end of each of said piston rods and first extending downwardly, thence around said second pulley, thence upwardly and over said first pulley, thence downwardly and terminating in a hook element secured thereto,
said supporting structure having means on its forward end for securing said supporting structure to a vehicle,
and a means for operatively moving said piston rods.

2. The structure of claim 1 wherein said supporting structure includes a pair of vertically disposed parallel channel members, said channel members each having means on their forward ends for securing said channel members to a vehicle.

3. The structure of claim 1 wherein said supporting structure includes a pair of vertically disposed parallel channel members and an elongated horizontal bumper member secured to the rearward ends of said channel members said channel members each having means on their forward ends for securing said channel members to a vehicle.

4. In a towing device, comprising in combination,
a pair of vertically disposed parallel channel members,
each of said channel members having secured thereto a supporting bracket on their rearward end,
said supporting brackets each having a flange member extending inwardly from their rearward edges and at a right angle thereto,
an elongated horizontal bumper member secured to each of said flange members,
each of said supporting brackets having a pulley supporting bracket secured thereto and extending inwardly from the inner surface of said supporting brackets,
a first pulley rotatably secured to each of said pulley supporting brackets,
a pair of normally upright hydraulic cylinders each pivotally secured at its lower end to one of said supporting brackets,
a piston rod slidably extending from the upper end of each of said hydraulic cylinders,
a second pulley rotatably secured to the outer end of each of said piston rods,
a pair of cables each having one end secured to the outer end of said piston rod and first extending downwardly, thence around said first pulley, thence upwardly and around said second pulley, thence downwardly and terminating in a hook element,
said vertically disposed channel members having means on their forward ends for securing said channel members to a vehicle,
and a means for operatively moving said piston rods.

5. In a towing device, comprising in combination,
a pair of vertically disposed parallel channel members,
each of said channel members having secured thereto a supporting bracket on their rearward end,
said support brackets each having a flange member extending inwardly from their rearward edges and at a right angle thereto,
said supporting brackets each having a second flange member extending inwardly at a right angle therefrom parallel to said first flange member and in a spaced relation thereto,
a pair of normally upright hydraulic cylinders each pivotally secured at its lower end to one of said supporting brackets, a piston rod slidably extending from the upper end of each of said hydraulic cylinders, a second pulley rotatably secured to the outer end of each of said piston rods, a pair of cables each having one end secured to the outer end of said piston rod and first extending downwardly, thence around said first pulley, thence upwardly and around said second pulley, thence downwardly and terminating in a hook element,
each of said hydraulic cylinders being pivotally secured to one of said supporting brackets between said first and second flange members,
a pin extending transversely through said first and second flange members on each of said supporting brackets to maintain said hydraulic cylinders in an upright position at times,
an elongated horizontal bumper member secured to each of said flange members,
each of said supporting brackets having a pulley supporting bracket secured thereto and extending inwardly from the inner surface of said supporting brackets,
a first pulley rotatably secured to each of said pulley supporting brackets,
said vertically disposed channel members having means on their forward ends for securing said channel members to a vehicle,
and a means for operatively moving said piston rods.

6. In a towing device, comprising in combination,
a pair of vertically disposed parallel channel members,
each of said channel members having secured thereto a supporting bracket on their rearward end,
said supporting brackets each having a flange member extending inwardly from their rearward edges and at a right angle thereto,
said supporting brackets each having a second flange member extending inwardly at a right angle therefrom parallel to said first flange member and in a spaced relation thereto,
a pair of normally upright hydraulic cylinders each pivotally secured at its lower end to one of said supporting brackets, a piston rod slidably extending from the upper end of each of said hydraulic cylinders, a detachable collar slidably embracing the outer end of said piston rod, a bolt having an eyelet on its inner end extending rearwardly through said collar and said piston rod, a second pulley rotatably secured to the upper end of each of said collars, a pair of cables each having one end secured to said eyelet and first extending downwardly, then around said first pulley, thence upwardly and around said second pulley, thence downwardly and terminating in a hook element, each of said hydraulic cylinders being pivotally secured to one of said supporting brackets between said first and second flange members, a pin extending transversely through said first and second flange members on each of said supporting brackets to maintain said hydraulic cylinders in an upright position at times, an elongated horizontal bumper member secured to each of said flange members, each of said supporting brackets having a pulley supporting bracket secured thereto and extending inwardly from the inner surface of said supporting brackets, a first pulley rotatably secured to each of said pulley supporting brackets, said vertically disposed channel members having means on their forward ends for securing said channel members to a vehicle, and a means for operatively moving said piston rods.

7. In a towing device, comprising in combination, a pair of vertically disposed parallel channel members, each of said channel members having secured thereto a supporting bracket on their rearward end, said supporting brackets each having a flange member extending inwardly from their rearward edges and at a right angle thereto, said supporting brackets each having a second flange member extending inwardly at a right angle therefrom parallel to said first flange member and in a spaced relation thereto, a pair of normally upright hydraulic cylinders each pivotally secured at its lower end to one of said supporting brackets, a piston rod slidably extending from the upper end of each of said hydraulic cylinders, a detachable collar slidably embracing the outer end of said piston rod, a bolt having an eyelet on its inner end extending rearwardly through said collar and said piston rod, a second pulley rotatably secured to the upper end of each of said collars, a pair of cables each having one end secured to said eyelet and first extending downwardly, then around said first pulley, thence upwardly and around said second pulley, thence downwardly and terminating in a hook element, each of said hydraulic cylinders being pivotally secured to one of said supporting brackets between said first and second flange members, a pin extending transversely through said first and second flange members on each of said supporting brackets to maintain said hydraulic cylinders in an upright position at times, an elongated horizontal bumper member secured to each of said flange members, each of said supporting brackets having a pulley supporting bracket secured thereto and extending inwardly from the inner surface of said supporting brackets, a first pulley rotatably secured to each of said pulley supporting brackets, a stop means rigidly secured to the inner surface of said horizontal bumper member intermediate its length and in the pivotal path of said hydraulic cylinders, said vertically disposed channel members having means on their forward ends for securing said channel members to a vehicle, and a means for operatively moving said piston rods.

8. In a towing device, comprising in combination, a pair of vertically disposed parallel channel members, each of said channel members having secured thereto a supporting bracket on their rearward end, said supporting brackets each having a flange member extending inwardly from their rearward edges and at a right angle thereto, said supporting brackets each having a second flange member extending inwardly at a right angle therefrom parallel to said first flange member and in a spaced relation thereto, a pair of normally upright hydraulic cylinders each pivotally secured at its lower end to one of said supporting brackets, a piston rod slidably extending from the upper end of each of said hydraulic cylinders, a detachable collar slidably embracing the outer end of said piston rod, a bolt having an eyelet on its inner end extending rearwardly through said collar and said piston rod, a second pulley rotatably secured to the upper end of each of said collars, a pair of cables each having one end secured to said eyelet and first extending downwardly, then around said first pulley, thence upwardly and around said second pulley, thence downwardly and terminating in a hook element, each of said hydraulic cylinders being pivotally secured to one of said supporting brackets between said first and second flange members, a pin extending transversely through said first and second flange members on each of said supporting brackets to maintain said hydraulic cylinders in an upright position at times, an elongated horizontal bumper member secured to each of said flange members, each of said supporting brackets having a pulley supporting bracket secured thereto and extending inwardly from the inner surface of said supporting brackets, a first pulley rotatably secured to each of said pulley supporting brackets, a stop means rigidly secured to the inner surface of said horizontal bumper member intermediate its length and in the pivotal path of said hydraulic cylinders, a pair of upright stub posts secured to the top portion of said horizontal bumper member adjacent each of said first flange members of said supporting brackets, a pair of hollow cylindrical elongated members detachably embracing said stub posts, said vertically disposed channel members having means on their forward ends for securing said channel members to a vehicle, and a means for operatively moving said piston rods.

9. In a towing device, comprising in combination, a pair of vertically disposed parallel channel members, each of said channel members having secured thereto a supporting bracket on their rearward end, said supporting brackets each having a first flange member extending inwardly from their rearward edges and at a right angle thereto, said supporting brackets each having a second flange member extending inwardly at a right angle therefrom parallel to said first flange member and in a spaced relation thereto, an elongated horizontal bumper member secured to each of said first flange members on said supporting brackets, each of said supporting brackets having a pulley supporting bracket secured thereto and extending inwardly at a right angle from the inner surface of said supporting brackets, a first pulley rotatably secured to each of said pulley supporting brackets, a hydraulic cylinder pivotally secured at its lower end to said supporting bracket between said first and second flange members, a piston rod slidably extending from the other end of said hydraulic cylinder, a stop means rigidly secured to the inner surface of said horizontal bumper member intermediate its length and in the pivotal path of said hydraulic cylinders, a detachable collar slidably embracing the upper end of said piston rod, a bolt having an eyelet on its inner end extending rearwardly through said collar and said piston rod, a second pulley rotatably secured to the upper end of each of said collars, a pin extending transversely through said first and second flange members on each of said supporting brackets to maintain said hydraulic cylinders in an upright position, a pair of upright stub posts secured to the top portion of said bumper member adjacent each of said first flange members of said supporting brackets, a pair of hollow cylindrical members detachably embracing said stub posts, a flat bracket rigidly secured to each of said hollow cylindrical members, each of said flat brackets having a hole in their outer ends adapted to be engaged by said pin extending through said first and second flange members, a pair of cables each having one end detachably secured to said eyelet and first extending downwardly, thence around said first pulley on said pulley supporting bracket, thence upwardly and around said second pulley on said collar, thence downwardly, and terminating in a chain link portion which terminates in a hook element portion, said vertically disposed channel members having means on their forward ends for securing said channel members to a vehicle, and a means operatively moving said piston rods.

10. The structure of claim 9 wherein said hydraulic cylinders are pivotally secured to said supporting brackets by means of a threaded member extending through said second flange member, an eyelet on the lower end of each of said hydraulic cylinders and said first flange member.

11. The structure of claim 9 wherein the horizontal bumper member is detachably secured to said supporting brackets by means of a threaded bolt member extending through said bumper member and engaging a bracket secured to each of said supporting brackets.

References Cited by the Examiner
UNITED STATES PATENTS

| 2,719,730 | 10/1955 | Beck. | |
| 2,932,416 | 4/1960 | Kenyon | 214—86 |
| 3,048,283 | 8/1962 | Phillips | 214—75 |
| 3,137,401 | 6/1964 | Curtis | 214—86 |

LEO FRIAGLIA, *Primary Examiner.*